United States Patent
Fischer

(10) Patent No.: US 9,382,996 B2
(45) Date of Patent: Jul. 5, 2016

(54) DEVICE AND METHOD FOR COOLING AN AXLE DIFFERENTIAL OF A MOTOR VEHICLE

(71) Applicant: Dr. Ing. h.c. F. Porsche Aktiengesellschaft, Stuttgart (DE)

(72) Inventor: Oliver Fischer, Korntal (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 252 days.

(21) Appl. No.: 14/079,017

(22) Filed: Nov. 13, 2013

(65) Prior Publication Data

US 2014/0135163 A1 May 15, 2014

(30) Foreign Application Priority Data

Nov. 15, 2012 (DE) .......................... 10 2012 111 017

(51) Int. Cl.
*F16H 57/04* (2010.01)
*B60K 11/06* (2006.01)
*B62D 35/02* (2006.01)

(52) U.S. Cl.
CPC ............ *F16H 57/0416* (2013.01); *B60K 11/06* (2013.01); *B62D 35/02* (2013.01)

(58) Field of Classification Search
CPC .................................................. F16H 57/0416

USPC ......................................................... 475/161
See application file for complete search history.

(56) References Cited

U.S. PATENT DOCUMENTS

| 5,513,893 A | 5/1996 | Nakata et al. |
| 6,036,615 A * | 3/2000 | Young ................. F16H 57/0412 |
| | | 475/161 |

FOREIGN PATENT DOCUMENTS

| DE | 4319281 A1 | 12/1994 |
| DE | 4429924 A1 | 3/1995 |
| DE | 19904515 A1 | 8/2000 |
| DE | 10350375 A1 | 6/2005 |
| DE | 102008009523 A1 | 8/2009 |
| DE | 102008061540 A1 | 6/2010 |
| GB | 2457382 A | 8/2009 |
| KR | 100821141 B1 | 4/2008 |

OTHER PUBLICATIONS

Search Report from German priority application DE 10 2012 111 017.4, dated Jul. 29, 2013, with partial English translation.

\* cited by examiner

*Primary Examiner* — Mark Manley
(74) *Attorney, Agent, or Firm* — RatnerPrestia

(57) ABSTRACT

A device and method for cooling an axle differential of a motor vehicle includes an air-guiding plate for guiding the air stream under the motor vehicle. An air-guiding plate is provided for guiding the air stream under the motor vehicle.

5 Claims, 1 Drawing Sheet

DEVICE AND METHOD FOR COOLING AN AXLE DIFFERENTIAL OF A MOTOR VEHICLE

CROSS-REFERENCE TO RELATED APPLICATION

This application claims priority to German Patent Application No. 10 2012 111 017.4, filed Nov. 15, 2012, which is incorporated by reference herein in its entirety.

FIELD OF THE INVENTION

The present invention relates to a device for cooling an axle differential of a motor vehicle, composed of an air-guiding plate for guiding the air stream under the motor vehicle. Furthermore, the present invention relates to a method for cooling an axle differential of a motor vehicle, wherein an air-guiding plate is provided for guiding the air stream under the motor vehicle.

BACKGROUND OF THE INVENTION

DE 44 29 924 A1, which is incorporated by reference herein, discloses an underfloor structure for automobiles. Said underfloor structure of an automobile is provided such that the air resistance below the floor of the automobile is reduced, and the cooling performance for heat-radiating parts such as a transmission is improved. Here, the already-known underfloor structure has an underside cover by means of which a high-pressure region can be covered in the downward direction. Furthermore, from the already-known underfloor structure, it is known that the air stream flows from the front end of the automobile along an underside and generates cooling of the rear-axle transmission. A disadvantage of the already-known underfloor structure is that any change in the flow under the vehicle generates a change in the flow resistance coefficient, or impairs the flow resistance coefficient of the motor vehicle.

KR 10-0821141 B1, which is incorporated by reference herein, discloses an air-guiding plate for cooling a rear-axle differential. The already-known air-guiding plate is held by a spring. At elevated vehicle speed, the relative wind overcomes the spring force and pushes the already-known air-guiding plate downward, which leads to cooling of the rear-axle differential. Thus, when a certain vehicle speed is reached, the air-guiding plate is pushed downward and impairs the flow resistance coefficient, which is less advantageous specifically at an elevated vehicle speed.

SUMMARY OF THE INVENTION

Disclosed herein is a device and a method for cooling an axle differential of a motor vehicle, which eliminates the above-mentioned disadvantages, and in particular to resolve the conflict of aims between optimum cooling of the axle differential and as low a flow resistance coefficient as possible.

Here, it is provided that the air-guiding plate is fastened to the axle differential such that an intrinsic movement of the axle differential causes an adjustment of the air-guiding plate. As a result of the fact that the air-guiding plate is fastened to the housing of the axle differential, the air-guiding plate follows the intrinsic movements of the axle differential. With the aid of the air-guiding plate, the axle differential guides the air stream under the vehicle to the axle differential or away from the axle differential. The air-guiding plate is fastened to the housing of the axle differential such that, as a result of the intrinsic movements of the axle differential, the air-guiding plate guides the air stream to the axle differential when the motor vehicle is braking and guides no air stream to the axle differential when the motor vehicle is travelling at a constant speed. The air-guiding plate guides the air stream away from the axle differential when the motor vehicle is accelerating. In this way, a negative pressure is generated at the axle differential, and the axle differential is ventilated. By means of the described measures, aeration and ventilation of the axle differential are attained, and at the same time there is an optimum flow resistance coefficient, known also as cd value, when the motor vehicle is travelling at a constant speed. In one advantageous refinement of the subject matter of the invention, the air-guiding plate has flow fins. Said flow fins are arranged on the underside and/or top side of the air-guiding plate in order to reduce to a minimum the flow resistance coefficient when the motor vehicle is travelling at a constant speed.

In a further advantageous refinement of the subject matter of the invention, the air-guiding plate is designed such that mechanical loads exerted on the axle differential are absorbed or at least partially absorbed.

It is provided in a method, according to aspects of the invention, that the air-guiding plate follows the intrinsic movements of the axle differential by virtue of the air-guiding plate being fastened to the axle differential. One advantageous refinement of the method according to aspects of the invention provides that, when the motor vehicle is braking, the air stream is guided to the axle differential, and that, when the motor vehicle is travelling at a constant speed, no air stream is guided to the axle differential. Furthermore, when the motor vehicle is accelerating, the air stream is guided away from the axle differential such that a negative pressure is generated at the axle differential.

BRIEF DESCRIPTION OF THE DRAWINGS

The present invention will be explained in more detail on the basis of an exemplary embodiment. In the drawing.

DETAILED DESCRIPTION OF THE INVENTION

Figure 1:
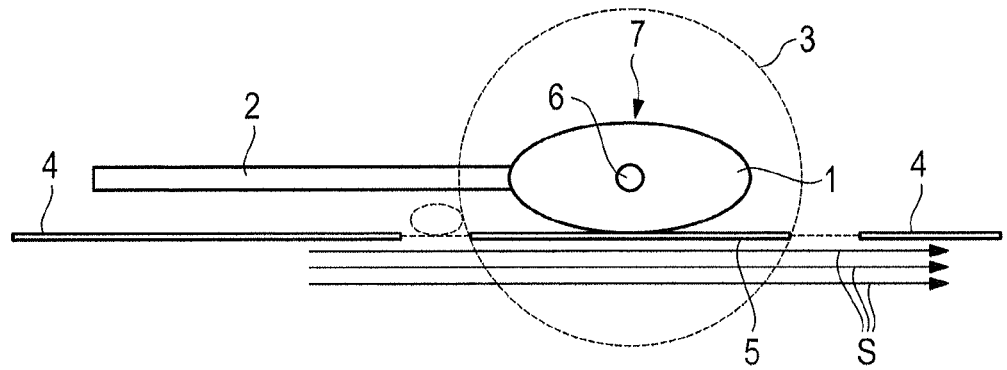
FIG. 1 is a schematic illustration of an axle differential of a motor vehicle, with a drive shaft and an underfloor lining, when the motor vehicle is travelling at a constant speed.

FIG. 1 schematically illustrates an axle differential of a motor vehicle; in the exemplary embodiment described here, this is the axle differential of a driven rear axle of a motor vehicle. The axle differential 1 is driven by a drive shaft 2, which in this case is in the form of a cardan shaft. The drive power of a drive engine (not illustrated) passes via the drive shaft 2 to the axle differential 1. There, the rear wheels, which in this case are indicated merely schematically and denoted by the reference numeral 3, are driven. Provided under the motor vehicle is an underfloor lining 4 which is arranged in front of the rear wheel 3 and behind the rear wheel 3. The air stream which is generated when the motor vehicle is travelling is denoted in FIG. 1 by the arrows underneath the vehicle. The air stream arrows are denoted by the reference sign S. In a corresponding driving situation, the axle differential 1 moves about an indicated axis 6. As will be explained in yet more detail below on the basis of FIGS. 2 and 3, the axle differential 1 moves about said axis 6. Said movement of the axle differential 1 is also referred to as the intrinsic movement of the axle differential 1. The intrinsic movements of the axle differential are utilized to thereby realize aeration and ventilation of the axle differential in accordance with requirements. An air-guiding plate 5 is fastened to the axle differential 1 such that the intrinsic movements of the axle differential 1 cause an adjustment of the air-guiding plate. FIG. 1 illustrates the situation in which the motor vehicle is travelling at a constant speed, and as can be seen from FIG. 1, at constant speed, the axle differential 1 is situated in a horizontal position. The air-guiding plate 5 connected to the axle differential is likewise situated in a horizontal position. The flow on the underfloor runs along horizontally under the motor vehicle. This is an optimum position for the air-guiding plate for a low air resistance. When the air-guiding plate 5 is in the position illustrated in FIG. 1, the flow resistance coefficient is optimal.

Figure 2:
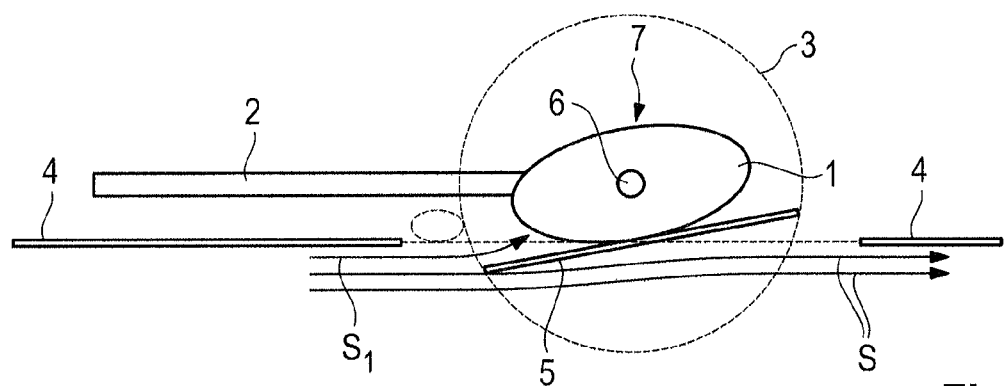
FIG. 2 is a schematic illustration corresponding to FIG. 1 when the motor vehicle is braking.

FIG. 2 illustrates the driving situation of the motor vehicle during braking. As is schematically illustrated in FIG. 2, the axle differential 1 tilts forward when the motor vehicle is braking. As a result, the air-guiding plate 5 is pushed downward at the front. As a result of the rotational movement of the axle differential 1 about the indicated axis 6, the air-guiding plate 5 moves downward at the left in FIG. 2, this end being situated in the direction of the front part of the vehicle. As a result of the opening of the air-guiding plate 5 in front of the axle differential 1, the flow S on the underfloor is changed such that an air stream S1 is guided to the axle differential 1. The tilting of the air-guiding plate 5 together with the housing 7 of the axle differential 1 causes the axle differential 1 to be aerated by the flow on the underfloor. As a result of the aeration of the axle differential 1, the axle differential 1 is cooled.

Figure 3:
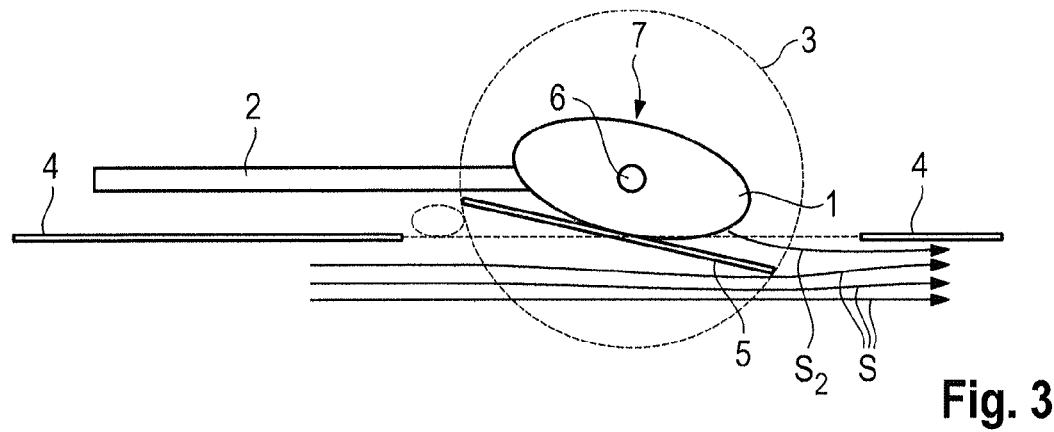
FIG. 3 is a schematic illustration corresponding to FIG. 1 when the motor vehicle is accelerating.

FIG. 3 illustrates the acceleration of the motor vehicle. Here, the axle differential 1 rotates in precisely the opposite direction in relation to the braking of the vehicle illustrated in FIG. 2. As can be seen from FIG. 3, the air-guiding plate 5 tilts in the opposite direction, that is to say downward at the right in the drawing. As can also be seen from FIG. 3, no air or no component of the air stream S is guided to the axle differential 1 as a result. On the contrary, a negative pressure is generated as a result of the tilting of the air-guiding plate 5 in the manner illustrated in FIG. 3. Said negative pressure causes the region around the axle differential 1 to be ventilated. This effect is similar to the effect of a turned-out sliding roof, wherein, as a result of the air stream around the motor vehicle, a negative pressure is likewise generated which results in ventilation of the interior compartment. In FIG. 3, said ventilation is denoted by the air stream S2. The tilting of the air-guiding plate for ventilation of the axle differential 1 when the motor vehicle is accelerating, as illustrated in FIG. 3, has only a very small influence on the flow on the underfloor. Thus, specifically when the motor vehicle is accelerating, the flow resistance coefficient is not influenced.

By contrast, when the motor vehicle is braking, as illustrated in FIG. 2, the flow resistance coefficient is influenced as a result of the tilting of the air-guiding plate. The flow resistance coefficient becomes greater when the motor vehicle is braking, as illustrated in FIG. 2. An increase in the flow resistance coefficient during braking is however acceptable, or even desirable.

It must also be pointed out that the fastening of the air-guiding plate 5 to the axle differential 1 has the effect that an intrinsic movement of the axle differential 1 causes an adjustment of the air-guiding plate 5. As has already been explained on the basis of FIGS. 1 to 3, as a result of the intrinsic movements of the axle differential 1 when the motor vehicle is braking, the air-guiding plate 5 guides the air stream S1 to the axle differential 1 and thereby cools the latter. At a constant speed, as illustrated in FIG. 1, the air-guiding plate 5 is situated in a horizontal position and does not influence the air resistance of the motor vehicle or the flow resistance coefficient of the motor vehicle. When the motor vehicle is accelerating, as has been explained on the basis of FIG. 3, the air stream S is guided away from the axle differential 1, such that a negative pressure is generated at the axle differential 1 and the axle differential 1 is ventilated, as indicated by the air stream S2. An effective aeration and ventilation of the axle differential 1 is attained in this particularly simple manner, without the flow resistance coefficient of the motor vehicle being considerably increased in the process.

To improve the flow resistance coefficient of the motor vehicle, the air-guiding plate 5 is, in one refinement of the subject matter of the invention, provided with flow fins, which are however not illustrated in FIGS. 1 to 3. Here, the flow fins are arranged on the underside of the air-guiding plate 5 in order to reduce to a minimum the flow resistance coefficient when the motor vehicle is travelling at a constant speed. Alternatively or in addition, the flow fins may be arranged on the top side of the air-guiding plate 5.

The flow fins attached to the underside of the air-guiding plate 5 serve to provide improved cooling of the axle differential 1 in all of the described driving situations by increasing the size of the cooling body. However, in the case of flow fins on the underside of the air-guiding plate 5, a problem often arises with regard to ground clearance.

If the flow fins are arranged on the top side of the air-guiding plate 5, the cooling of the axle differential 1 is likewise improved as a result of the increase in size of the cooling body. Said improved cooling owing to the flow fins is however effective only during an aeration of the axle differential 1 as illustrated in FIG. 1.

Furthermore, the air-guiding plate 5 may be designed such that mechanical loads, such as impacts or shocks, exerted on the axle differential 1 are absorbed or at least partially absorbed.

The core concept of the present invention is thus that of the air-guiding plate 5 following the intrinsic movements of the axle differential 1 by virtue of the air-guiding plate 5 being fastened to the axle differential 1. Here, the intrinsic movements of the axle differential 1 are utilized to ensure cooling of the axle differential 1 and to simultaneously attain an optimum flow resistance coefficient (cd value).

What is claimed:

1. A device for cooling an axle differential of a motor vehicle, composed of an air-guiding plate for guiding an air stream under the motor vehicle, wherein the air-guiding plate is fastened to the axle differential such that an intrinsic movement of the axle differential causes an adjustment of the air-guiding plate, wherein the air-guiding plate is fastened to a housing of the axle differential and as a result of the intrinsic movements of the axle differential, the air-guiding plate guides the air stream to the axle differential when the motor vehicle is braking, guides no air stream to the axle differential when the motor vehicle is travelling at a constant speed, and guides the air stream away from the axle differential, such that a negative pressure is generated at the axle differential, when the motor vehicle is accelerating.

2. The device as claimed in claim 1, wherein the air-guiding plate has flow fins.

3. The device as claimed in claim 2, wherein the flow fins are arranged on an underside and/or a top side of the air-guiding plate in order to reduce to a minimum the flow resistance coefficient when the motor vehicle is travelling at a constant speed.

4. The device as claimed in claim 1, wherein the air-guiding plate is designed such that mechanical loads exerted on the axle differential are absorbed or partially absorbed.

5. A method for cooling an axle differential of a motor vehicle, wherein an air-guiding plate is provided for guiding an air stream under the motor vehicle, wherein the air-guiding plate follows an intrinsic movement of the axle differential by virtue of the air-guiding plate being fastened to the axle differential, wherein when the motor vehicle is braking, the air stream is guided to the axle differential, wherein when the motor vehicle is travelling at a constant speed, no air stream is guided to the axle differential, and, wherein when the motor vehicle is accelerating, the air stream is guided away from the axle differential such that a negative pressure is generated at the axle differential.

\* \* \* \* \*